United States Patent [19]
Kamel et al.

[11] Patent Number: 4,557,221
[45] Date of Patent: Dec. 10, 1985

[54] FUEL ADDITIVE INJECTION SYSTEM

[75] Inventors: Mostafa M. Kamel; Larry D. Wells; Jerry C. Buchanan, all of Columbus, Ind.

[73] Assignee: Cummins Engine Company, Inc., Columbus, Ind.

[21] Appl. No.: 498,717

[22] Filed: May 27, 1983

[51] Int. Cl.⁴ .............................................. F02B 51/00
[52] U.S. Cl. .............................. 123/1 A; 123/198 A; 123/180 R
[58] Field of Search ........... 123/1 A, 557, 453, 180 R, 123/198 A, 513, 516

[56] References Cited
U.S. PATENT DOCUMENTS

| | | | |
|---|---|---|---|
| 2,599,699 | 6/1952 | Dilworth et al. | 123/1 A |
| 2,958,317 | 11/1960 | McNally | 123/198 A |
| 4,161,160 | 7/1979 | Hicks et al. | 123/1 A |
| 4,170,960 | 10/1979 | Germack et al. | 123/1 A |
| 4,182,278 | 1/1980 | Coakwell | 123/198 A |
| 4,231,342 | 11/1980 | Johnston | 123/557 |
| 4,253,436 | 3/1981 | Dudrey | 123/1 A |
| 4,331,121 | 5/1982 | Stokes | 123/575 |
| 4,346,689 | 8/1982 | Neely | 123/575 |

Primary Examiner—E. Rollins Cross
Attorney, Agent, or Firm—Neuman, Williams, Anderson & Olson

[57] ABSTRACT

A diesel engine fuel supply system wherein additives for improving the cetane number of diesel fuel are mixed with the diesel fuel and wherein return fuel containing such additives are recirculated to the engine without being passed to the fresh fuel tank.

8 Claims, 8 Drawing Figures

FUEL ADDITIVE INJECTION SYSTEM

This invention relates to systems for supplying fuel to diesel engines.

When diesel engines operate cold, such as when first started, they frequently emit excessive quantities of "white smoke" which is undesirable from an air pollution standpoint. To improve the operation of diesel engines, additives have been added to the diesel fuel to improve the cetane number of the diesel fuel and thereby reduce "white smoke" emission. For example, U.S. Pat. No. 4,161,160 relates to a diesel fuel supply system wherein fuel additives are mixed with the fuel to improve the cetane number thereof. Such a fuel supply system is not satisfactory for use with diesel engine systems which employ very little fuel during cold or idle running conditions and wherein a large percentage of the fuel fed to the engine is returned to the fuel tank. With such diesel engine systems, a cetane number improving additive is required to effectively reduce emission of "white smoke" during cold operation and since a large percentage of fuel is returned to the fuel tank there is a substantial build-up in concentration of the additive in the fuel tank. This is undesirable since the cetane increaser additives are not only quite costly but they cause a loss of power and increased engine emissions when the diesel engine is running warm or at normal operating temperature.

Accordingly, it is a major object of this invention to provide an improved fuel supply system.

It is another object of the invention to provide a system for supplying fuel containing ignition improving additives to diesel engines.

A still further object of the invention is to provide a diesel fuel supply system wherein the ignition improving additive is prevented from building up in the fuel tank.

An additional object of the invention is to provide a system for injecting for a desired period of time ignition improving additives into the fuel supply of a diesel engine.

A further object of the invention is to provide a system for injecting ignition improving additives into the fuel supply of a diesel engine during engine cranking.

Additional objects and advantages of the invention will become apparent from the following discussion taken in conjunction with the accompanying drawings.

Figure 1:
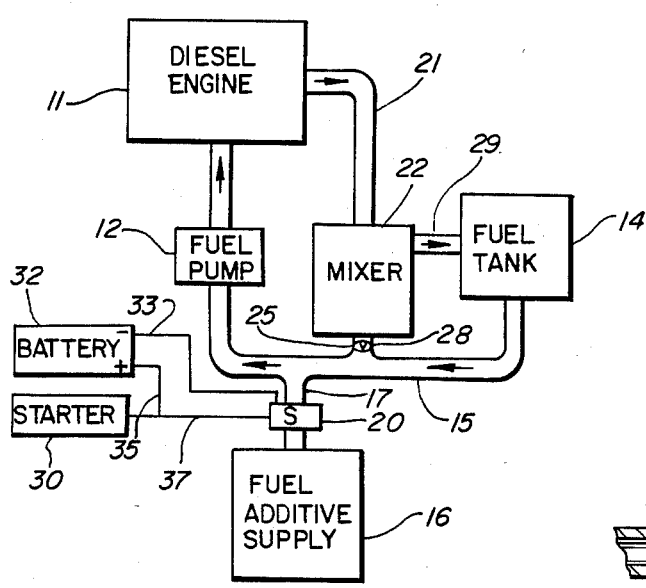
FIG. 1 is a schematic diagram of a fuel supply system for a diesel engine in accordance with one embodiment of the invention.

Referring to the embodiment of the invention illustrated in FIG. 1, numeral 11 designates a diesel engine having associated therewith fuel pump 12 of conventional type. Diesel fuel is pumped by fuel pump 12 from fuel tank 14 through fuel supply line 15. A fuel additive supply tank 16 holds a supply of a liquid additive which boosts or increases the cetane number of the diesel fuel. A number of such cetane improving additives are known in the art. Additive supply conduit 17 connects with the main fuel supply line 15 and a solenoid valve 20 in conduit 17 controls the flow of additive into the fuel supply line 15. The solenoid valve 20 can be energized by a push button starter switch and a time delay relay as is known and as described, for example, in U.S. Pat. No. 4,161,160. Solenoid valve 20 forms part of an electrical circuit which includes starter 30, battery 32 and connecting wires 33, 35 and 37. The time delay is usually set to provide an additive injection period of about 2 minutes, although this can be varied as desired depending upon the operating conditions and characteristics of the diesel engine. It is preferred for reasons of economy that the time delay be sufficiently short so that the additive for increasing the fuel cetane number is injected only as long as necessary to achieve a desired reduction in "white smoke" emission, i.e., until the engine warms up.

Figure 3:
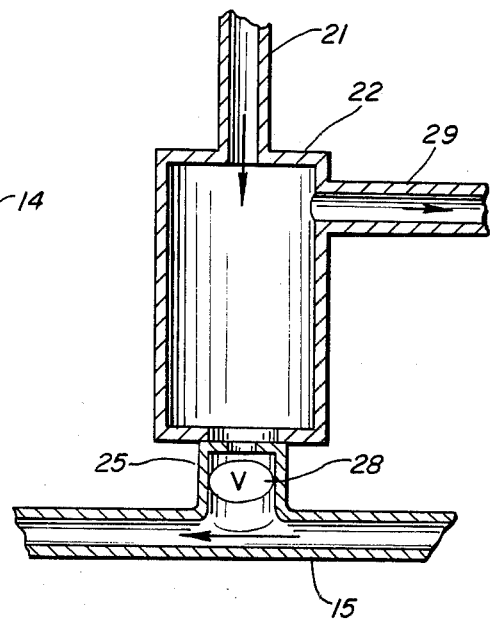
FIG. 3 is an enlarged cross-sectional view of one form of a fuel return mixer used in the fuel supply system of the invention.

During cold engine operation, a large percentage of the fuel supplied to the diesel engine 11 is not utilized and drains therefrom through drain line 21 to fuel return mixer 22. As shown enlarged in greater detail in FIG. 3, fuel return mixer 22 is preferably a tank of relatively small size, such as, for example, a cylindrical tank having a height of 3 inches and a diameter of 1½ inches. A small discharge conduit designated by the numeral 25 located at the bottom of mixer 22 connects with fuel supply line 15. The internal diameter of the discharge conduit 25 can be relatively small, say on the order of 0.060 to 0.100 inch.

Temperature responsive valve means 28 controls the flow of liquid through the discharge conduit 25 to the main fuel supply line 15. The thermostatically controlled valve 28 is set to remain in open position to permit the return fuel to recirculate to the diesel engine 11 when the temperature of the return fuel is below a set value, such as, for example, 100° F. When the return fuel entering fuel return mixer 22 is above the predetermined set temperature, valve 28 closes and prevents return fuel from being recirculated to the engine. This causes excess return fuel to collect in fuel return mixer 22 from which it is then returned to fuel tank 14 via return conduit 29. While valve 28 is in open position all return fuel flowing into mixer 22 is directed into fuel supply line 15 and recirculated to the diesel engine. Only after valve 28 is closed does return fuel collect and its level build up in mixer 22. At this time the engine is usually warmed sufficiently so that no additional fuel additive need be present in the fuel. Thus, when excess return fuel is permitted to be returned to the fuel tank 14 through conduit 29 it contains little or no cetane improving additives so that these additives do not build up a high concentration in fuel tank 14 so as to contaminate the diesel fuel therein.

In operation of the fuel supply system of the invention, as illustrated in FIG. 1, the diesel engine is started which causes fuel pump 12 to pump through supply line 15 diesel fuel from fuel tank 14. At this time solenoid valve 20 in additive supply conduit 17 is activated to cause a cetane number improving additive to be injected into and mix with the fuel being pumped to the engine 11. With the use of a time delay, the solenoid valve 20 will remain open a set period permitting injection of the fuel additive for a set time, say 2 minutes. While the diesel engine is cold and idling, a large percentage, sometimes on the order of 75% or more, of the fuel supplied thereto is returned via line 21 to return fuel mixer 22. This returned fuel also includes a large proportion of the cetane increasing additive which had been mixed therewith. The fuel from the cold diesel engine 11 which is returned to fuel return mixer 22 is at a temperature higher than the fresh fuel in fuel tank 14 but at a temperature which is insufficient to actuate and to close the thermostatically controlled valve 28. Valve 28 is preferably set to close and prevent passage of fuel through discharge conduit 25 at a temperature of about 100° to 110° F. Thus, the relatively cold return fuel passes through fuel return mixer 22 and is mixed in supply line 15 with the fresh fuel being pumped to the engine. When the engine is warm and operating near normal temperatures, the fuel returned to return mixer 22 is at a temperature sufficiently high, say above 110° F., so as to actuate and close the thermostatic valve 28. This prevents return fuel from discharging through discharge conduit 25 and passing into the fuel supply line 15. When thermostat valve 28 is in closed position, return fuel collects in fuel return mixer 22 and when it substantially fills the mixer excess fuel is returned via line 29 to fuel tank 14. The fuel returned to fuel tank 14 contains little or none of the cetane increasing additives since the return fuel does not collect in the return mixer 22 until the temperature of the return fuel exceeds a predetermined value, such as 100°-110° F. By the time the return fuel flowing into mixer 22 reaches this temperature, the diesel engine is no longer cold and the injection of cetane improving additives has ceased.

Figure 4:
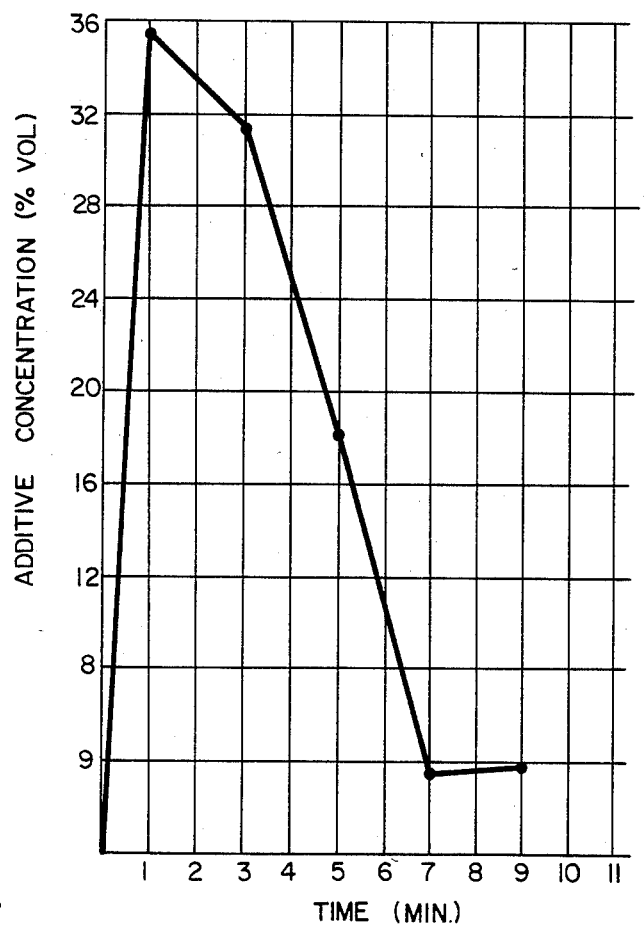
FIG. 4 is a graphical representation of fuel additive concentration in the return fuel with respect to time.

The advantages of recirculating return fuel containing cetane improving additives directly to the diesel engine and not to the fuel tank is emphasized from a consideration of FIG. 4, which is a graphical plot of additive concentration in the return fuel being returned to the fuel return mixer 22 with respect to time. To obtain the data of the plot of FIG. 4, a cetane improving additive was injected into the fuel supply line for a period of 2 minutes and the concentration of the additive in the fuel being returned from the engine was determined. As seen, the additive concentration was highest when the engine was cranked and additive injection initiated. The additive concentration decreased rapidly due to dilution of fresh fuel from the fuel supply tank. Thus, by recirculating to the diesel engine the return fuel containing a high percentage of the fuel additive during initial operation of the diesel engine consumption of the cetane boosting fuel additives is greatly reduced. Also, by preventing the return fuel from returning directly to the fuel supply tank during the initial operation, contamination of the fuel in the fresh fuel tank 14 with such additives is minimized.

Figure 5:
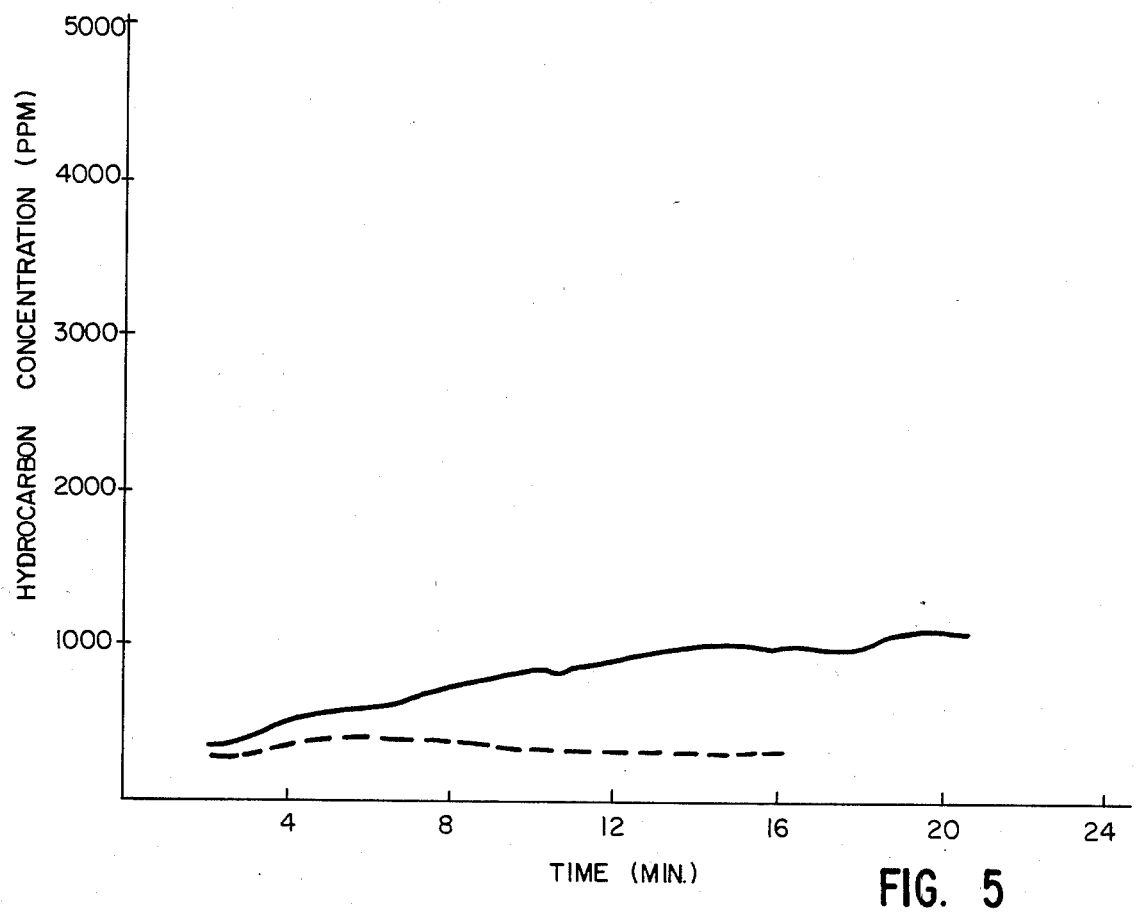
FIG. 5 is a graphical comparison of "white smoke" emission from a diesel engine with respect to time when fuel is recirculated according to this invention and when fuel is not recirculated according to the invention.

By recirculating return fuel to the engine during initial cold engine operation in accordance with the invention, significant improvement in emission of "white smoke" is achieved. FIG. 5 is a plot of "white smoke" emission (expressed as unburned hydrocarbon concentration) with respect to time. The data plotted in the broken line was obtained when the return fuel was returned to the fuel return mixer 22 from which it was recirculated to the diesel engine in accordance with this invention. The data plotted by the solid line was obtained under the same conditions except that the return fuel was returned directly to the fuel supply tank 14.

Figure 2:
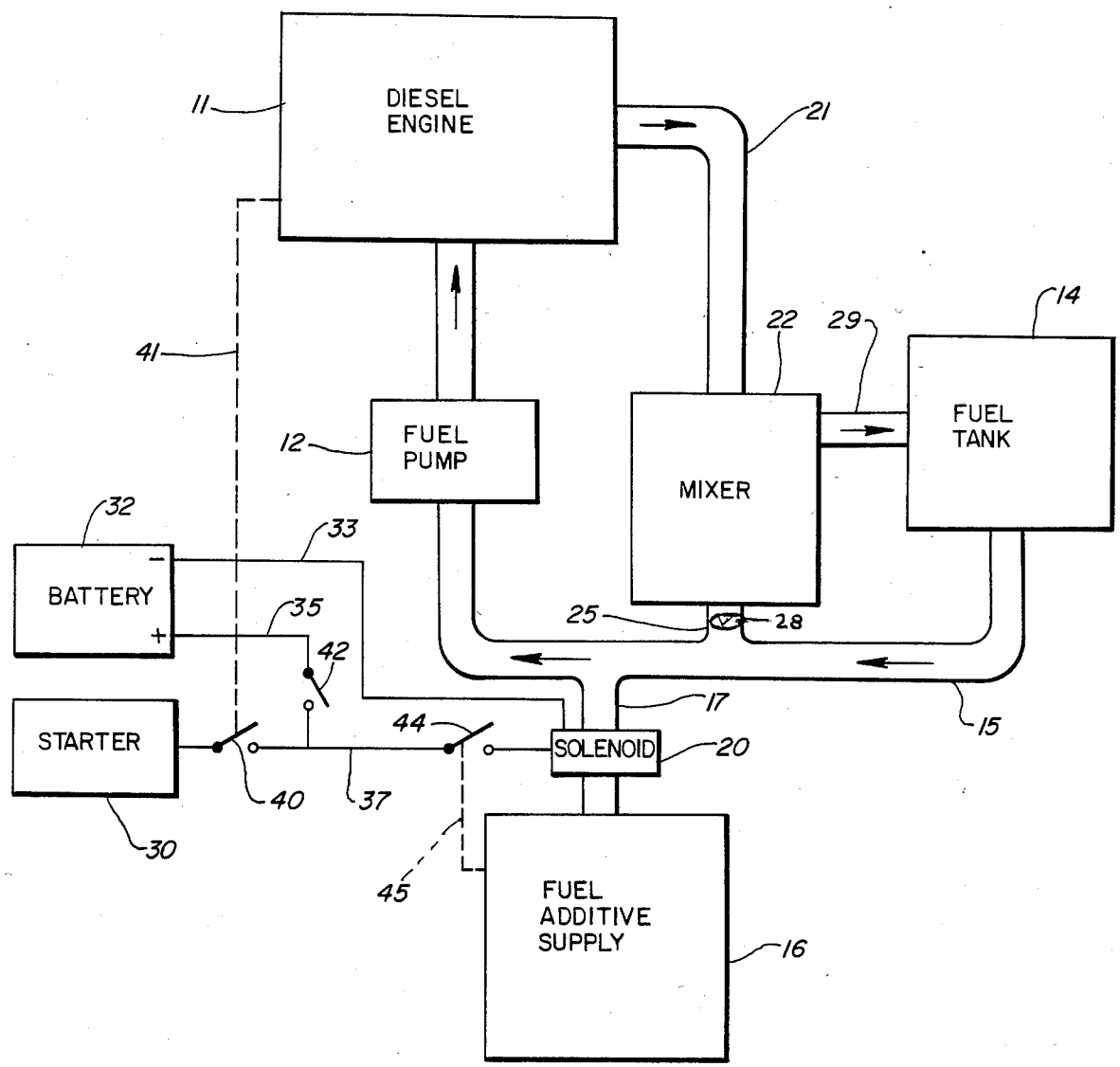
FIG. 2 is a schematic diagram of a fuel supply system for a diesel engine in accordance with another embodiment of the invention.

Another embodiment of the fuel additive injection system according to the invention is illustrated in FIG. 2 of the drawings. In this embodiment of the invention, the solenoid valve 20 is energized so as to accomplish injection of the fuel additive while the diesel engine is being cranked or for a longer period, if desired. To this end, a temperature switch 40 is incorporated in the electrically conductive line 37 which forms part of an electrical circuit which includes solenoid valve 20, starter 30 and battery 32. Various known means (not shown) for activating (opening) the solenoid valve through the electrical circuit can be employed, such as, for example, a button contact accessible to an operator. Any suitable type of temperature sensing means is attached to diesel engine 11 and operatively connects with switch 40 by lead line 41. The temperature switch 40 is set to close and complete the electrical circuit when the temperature of the diesel engine (or ambient) is below a predetermined value, say 50° F. or lower. However, when it is desired to inject the fuel additive into the fuel being supplied to the engine irrespective of the engine temperature, this can be accomplished by deliberately closing override switch 42 thus completing the electrical circuit and energizing solenoid valve 20. Incorporation of an override switch is optional and need not be employed if the override feature is not desired. Also forming a part of the electrical circuit which controls the operation of solenoid valve 20 is switch 44 which is responsive to the level of fuel additive in supply tank 16. Switch 44 is programed to close and complete the electrical circuit only when the supply of fuel additive in tank 16 is adequate. When the fuel additive level in supply tank 16 falls below a set value which can be determined, for example, by a float sensor within tank 16, a signal is sent via lead line 45 to switch 44 to cause the switch to open with concomitant de-energization of solenoid valve 20. Again, level sensitive switch 44 is an optional embodiment and need not be used in the system.

Figure 6:
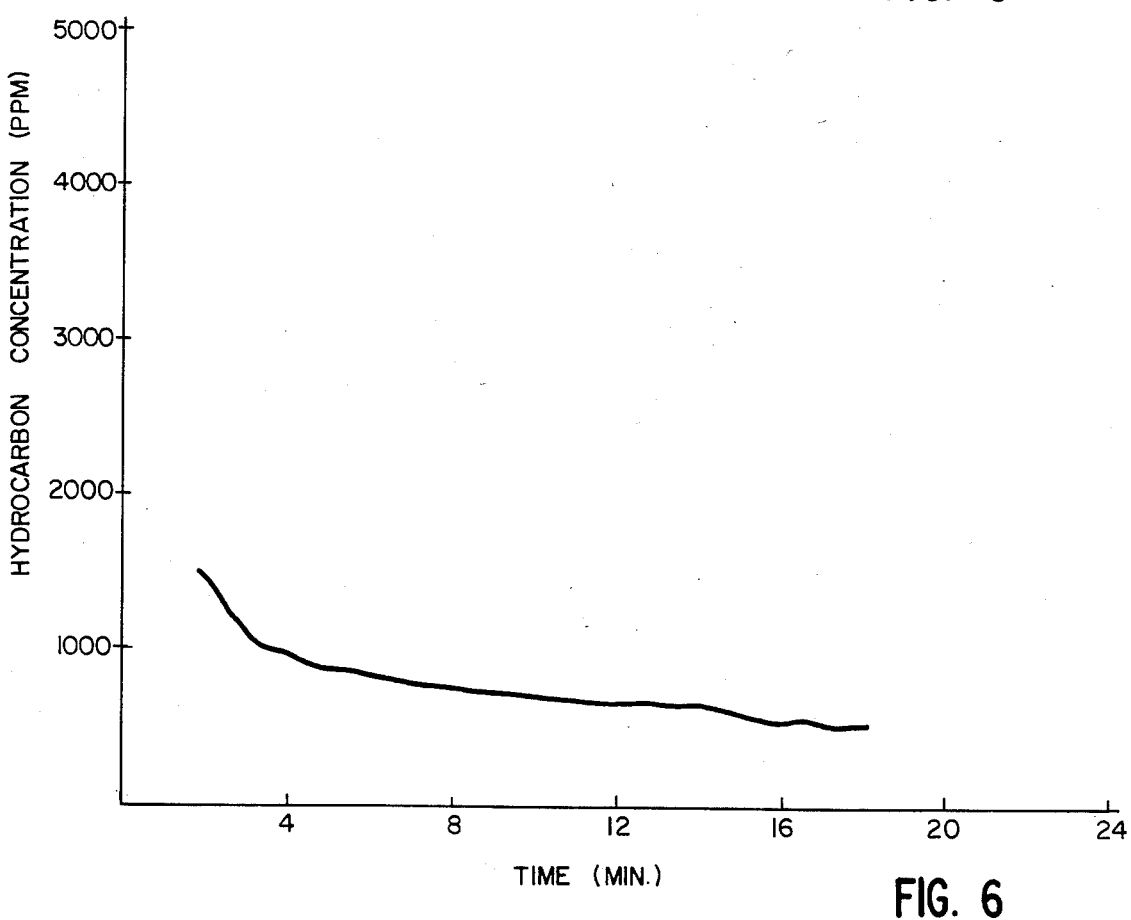
FIG. 6 is a graphical representation of "white smoke" emission from a diesel engine when the fuel additive is injected only during engine cranking in accordance with the invention.
Figure 7:
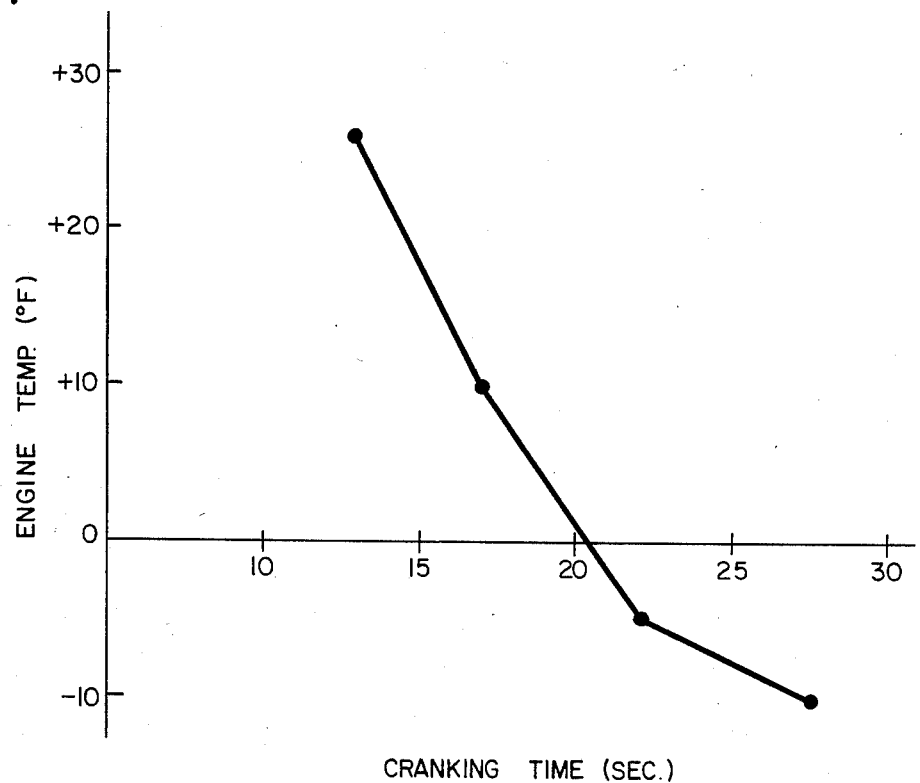
FIG. 7 is an illustrative graphical representation of engine cranking time with respect to temperature.
Figure 8:
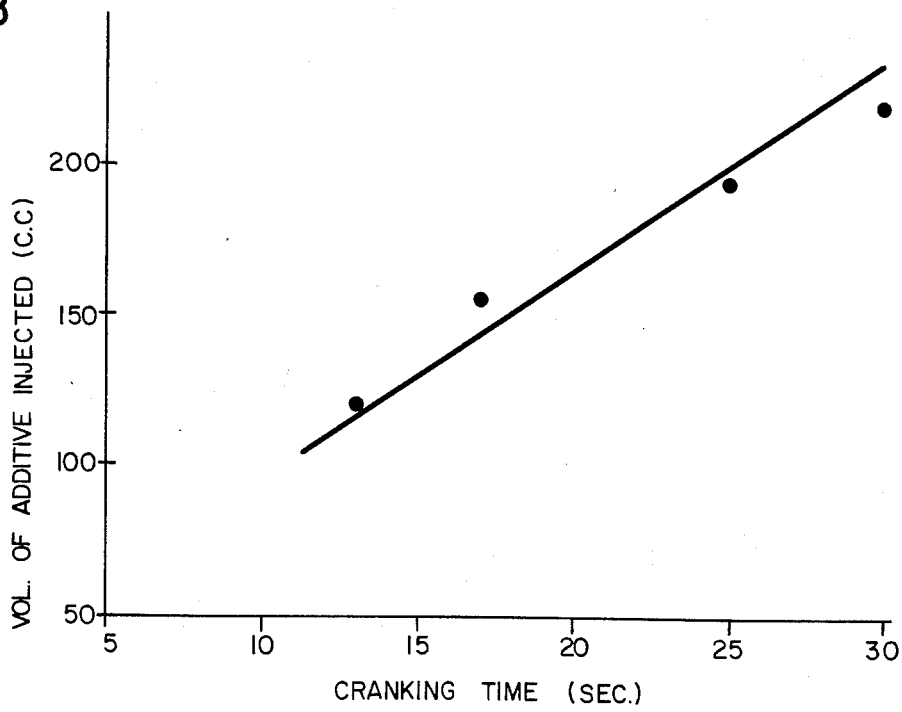
FIG. 8 is an illustrative graphical representation of fuel additive use with respect to engine cranking time.

With the fuel injection system shown in FIG. 2, the solenoid valve 20 is energized so as to cause injection of the fuel additive as long as the diesel engine is being cranked provided, of course, that the engine temperature and fuel additive level conditions are satisfied. This embodiment of the fuel injection system of the invention is particularly advantageous when operating diesel engines under low ambient temperature conditions when longer cranking conditions are required to start the engine. An illustrative correlation between diesel engine temperature and cranking time required to start the engine is graphically shown in FIG. 7. As seen, generally a longer cranking time is required to start a diesel engine as engine temperature decreases. With longer cranking times, a greater amount of fuel additive can be injected into the supply fuel as graphically shown by the illustrative plot of FIG. 8. The fuel injection system shown in FIG. 2 possesses advantages over a system where the fuel additive is injected for a set time only. This "on demand" system of fuel additive injection is particularly advantageous when operating at very low ambient temperatures. When the fuel additive is injected into the fuel only during cranking, "white smoke" emission is maintained at a low level, as graphically illustrated in FIG. 6. The data plotted in FIG. 6 was obtained with injection of 110 cubic centimeters of fuel additive during cranking of a diesel engine.

The present invention provides significant savings in regard to consumption of costly additives which boost the cetane number of diesel fuels. Moreover, the return fuel which is discharged from the fuel return mixer and mixed with fresh fuel is usually at a higher temperature than the fresh fuel and thus it serves to heat the fresh fuel being fed to the engine. By such heating of the fuel being fed to the engine, waxing and water crystallization problems encountered with cold weather conditions are reduced.

Those modifications and equivalents which fall within the spirit of the invention are to be considered a part thereof.

What is claimed is:

1. The combination of a diesel engine, a fuel tank, a fuel supply line in communication with said engine for supplying fuel from said fuel tank to said engine through a fuel pump, a fuel additive tank containing an ignition improving additive, a fuel additive supply line communicating with said fuel additive tank and said fuel supply line, valve means in said fuel additive supply line for controllably supplying an ignition improving additive from the said fuel additive tank to said fuel supply line, a receptacle for receiving return fuel from said diesel engine having a first discharge outlet connecting with said fuel supply line and a second discharge outlet connecting with said fuel tank and temperature responsive valve means which below a predetermined temperature directs flow from the first discharge outlet of said receptacle to said fuel supply line and which above a predetermined temperature directs fuel to said fuel tank whereby build-up of the ignition improving additive in said fuel tank is minimized.

2. The combination of claim 1 which includes a conduit connecting said receptacle and said fuel tank.

3. The combination of claim 1 wherein said valve means in the said fuel additive supply line is normally closed and when activated opens for a set period of time.

4. The combination of cliam 1 wherein said valve means in said fuel additive supply line is a solenoid valve.

5. The combination of claim 1 wherein said valve means in said fuel additive supply line is part of an electrical circuit containing a switch which opens and closes in response to the temperature of the diesel engine.

6. The combination of claim 5 which includes means for activating said valve means through said electrical circuit while the engine is being cranked.

7. The combination of claim 1 wherein said valve means in said fuel additive supply line is part of an electrical circuit containing a switch which is responsive to the level of fuel additive in said fuel additive tank.

8. The combination of claim 1 wherein said valve means in said fuel additive supply line is part of an electrical circuit containing a switch which opens and closes in response to the temperature of the diesel engine and which contains a switch which is responsive to the level of fuel additive in said fuel additive tank and which electrical circuit further contains an additive override switch which is operative to complete the electrical circuit when said temperature response switch is in open position.

* * * * *

UNITED STATES PATENT AND TRADEMARK OFFICE
CERTIFICATE OF CORRECTION

PATENT NO. : 4,557,221

DATED : December 10, 1985

INVENTOR(S) : Mostafa M. Kamel et al.

It is certified that error appears in the above-identified patent and that said Letters Patent is hereby corrected as shown below:

Change the name of the second inventor to read

-- Larry D. Walls --.

Signed and Sealed this

Thirteenth Day of October, 1987

Attest:

DONALD J. QUIGG

Attesting Officer

Commissioner of Patents and Trademarks